April 30, 1929.　　N. W. STORER ET AL　　1,710,792

MOTOR CONTROL SYSTEM

Filed Dec. 23, 1924　　6 Sheets-Sheet 1

Fig.1.

WITNESSES:

INVENTORS
Norman W. Storer,
Andrew H. Candee, and
Louis M. Aspinwall.
BY
ATTORNEY April 30, 1929. N. W. STORER ET AL 1,710,792
MOTOR CONTROL SYSTEM
Filed Dec. 23, 1924   6 Sheets-Sheet 2

WITNESSES:

INVENTORS
Norman W. Storer,
Andrew H. Candee and
Louis M. Aspinwall.
BY
ATTORNEY

April 30, 1929.  N. W. STORER ET AL  1,710,792

MOTOR CONTROL SYSTEM

Filed Dec. 23, 1924  6 Sheets-Sheet 3

WITNESSES:

INVENTORS
Norman W. Storer,
Andrew H. Candee and
Louis M. Aspinwall.
BY
ATTORNEY April 30, 1929.  N. W. STORER ET AL  1,710,792
MOTOR CONTROL SYSTEM
Filed Dec. 23, 1924  6 Sheets-Sheet 4

WITNESSES:

INVENTORS
Norman W. Storer
Andrew H. Condee and
Louis M. Aspinwall.
BY
ATTORNEY

April 30, 1929.                N. W. STORER ET AL                1,710,792
MOTOR CONTROL SYSTEM
Filed Dec. 23, 1924            6 Sheets-Sheet 5

WITNESSES:

INVENTORS
Norman W. Storer
Andrew H. Condee and
Louis M. Aspinwall
BY
ATTORNEY

Patented Apr. 30, 1929.

1,710,792

UNITED STATES PATENT OFFICE.

NORMAN W. STORER, OF PITTSBURGH, ANDREW H. CANDEE, OF WILKINSBURG, AND LOUIS M. ASPINWALL, OF PITTSBURGH, PENNSYLVANIA, ASSIGNORS TO WESTINGHOUSE ELECTRIC AND MANUFACTURING COMPANY, A CORPORATION OF PENNSYLVANIA.

MOTOR-CONTROL SYSTEM.

Application filed December 23, 1924. Serial No. 757,625.

Our invention relates to motor-control systems and it has particular relation to control systems employed to govern the operation of railway motor vehicles.

One object of our invention is to provide a relatively small dynamo-electric machine or auxiliary motor to be mounted upon one of the trucks of a railway motor vehicle for alternatively acting as a driving motor for the vehicle and as an exciter for the field-magnet winding of each of the main motors. In other words, the dynamo-electric machine acts as a motor when the vehicle is actuated by the main motors and as a generator when the vehicle is retarded by the electrical braking action of the main motors.

A second object of our invention is to provide means for so changing the relations or connections of a plurality of motors, one to another, during regeneration, that all of the main motors shall be regenerating during the transition period.

A third object of our invention is to provide a motor-control system for a plurality of dynamo-electric machines with means for so connecting the motors in different relations, one to another, that the motors shall never be even momentarily inoperative during the transition from one relation to another, regardless of whether the machines are operating as motors or generators.

Another object of our invention is to provide relatively small dynamo-electric machines or motors to be mounted upon the trucks of a railway motor vehicle for the purpose of acting, during acceleration, as auxiliary motors to assist the main motors, and, during braking, as exciters for the field-magnet windings of the main motors.

A further object of our invention is to provide means for separately exciting the field-magnet winding of the auxiliary motor in such manner that the control system shall be quickly responsive to any change in the electrical braking condition of the main motors.

Briefly speaking, our invention comprises providing two extra main switches or contactors in conjunction with prior systems for more effectively changing the relations of a plurality of main motors from series to parallel, or vice versa, thereby making it possible to have all motors in operation during all steps of the transition from one relation to another during both acceleration and regeneration. It also comprises providing the railway motor vehicle with a relatively small dynamo-electric machine or auxiliary motor to be geared to an axle of the vehicle and arranged to help drive the vehicle or be driven by it, according to whether it is acting as a motor or as a generator. The auxiliary motor will have two separate armature windings, with separate commutators, if it energizes the field-magnet winding of more than one motor; or each main motor may be provided with a corresponding auxiliary motor, in which case, each auxiliary motor has only one commutator. Our invention also comprises providing novel means for governing the energization of the field-magnet winding of the auxiliary dynamo-electric machine in such a manner that the main motors shall be more effectively operated during the periods of acceleration and regeneration.

For a better understanding of our invention, reference may be made to the accompanying drawings, Figure 1 of which is a schematic view of the main circuits of a control system organized in accordance with our invention and employed to govern a railway motor vehicle.

Figure 1:
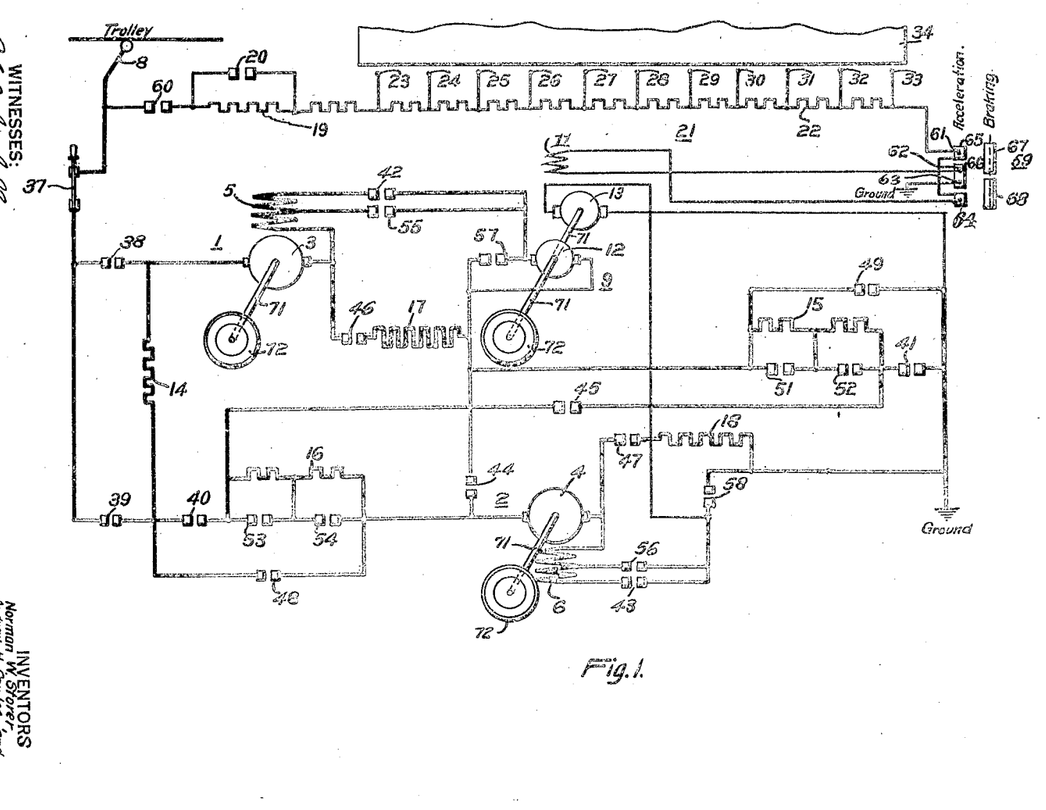

Referring particularly to Fig. 1, a plurality of dynamo-electric machines or main motors 1 and 2 are provided with armature windings 3 and 4 and series field-magnet windings 5 and 6, respectively.

The motors 1 and 2 are employed to drive a railway motor vehicle which is also shown as provided with an auxiliary dynamo-electric machine or motor 9 having a field-magnet winding 11 and separate armature windings 12 and 13. The elements of machine 9 are shown as separated, for the sake of clearness. The machine 9 is employed as a driving motor during acceleration and as an exciter during electrical braking of the vehicle, as hereinafter more fully described.

A plurality of accelerating or starting resistors 14 to 16, inclusive, are employed to govern the operation of the main motors 1 and 2.

A plurality of stabilizing resistors 17 and 18 are provided for so governing the operation of the control system during regeneration, that the energization of the field-magnet winding of each main motor is approximately in inverse proportion to the current that is regenerated thereby, thus tending to maintain constant braking effort of the motors.

Figure 14:
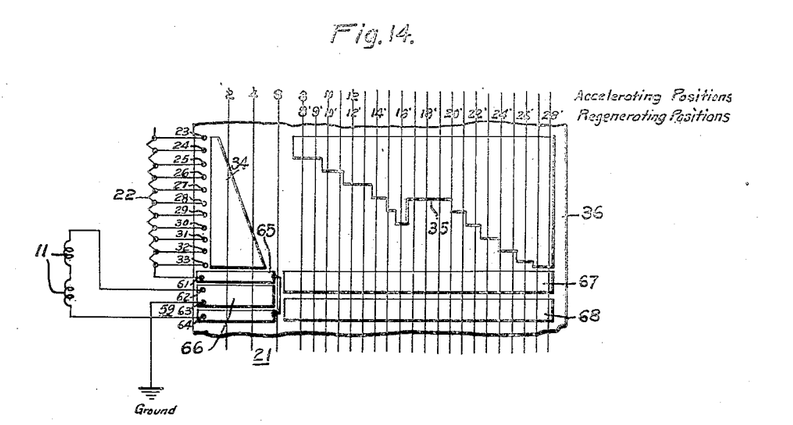
Fig. 14 is a diagrammatic view of a portion of the controller employed to govern the energization of the field-magnet winding of the auxiliary dynamo-electric machine or motor illustrated in Fig. 1 of the drawing.

The energization of the field-magnet winding 11 of the auxiliary motor 9 is governed by a plurality of voltage-varying devices, one of which comprises a resistor 19, a portion of which may be shunted by means of switch or contactor 20, to effect rapid increase in the energization of the winding 11, the other device being an auxiliary controller or sequence switch 21. The controller 21 comprises a resistor 22 having a plurality of stationary terminals or control fingers 23 to 33, inclusive, which are adapted to be engaged by contact segments 34 and 35 that are mounted upon a rotatable drum 36, only a portion of which is illustrated in Figs. 1 and 14 of the drawing. The object of the sequence switch 21 is to secure a predetermined and uniform change in the energization of the winding 11 of the auxiliary motor 9, as hereinafter more fully set forth.

The motors 1 and 2 may be connected in parallel relation across a source of electrical energy marked "Trolley" and "Ground", by means of a manually operable switch 37, line switches 38 and 39, parallel connecting switch 40, ground switch 41, and "full field" switches 42 and 43. Series connecting switches or contactors 44 and 45 are provided for connecting the main motors 1 and 2 in series relation one to another.

Regeneration switches 46 and 47 are employed to connect the stabilizing resistors 17 and 18, respectively, in circuit with the main motors 1 and 2 during regeneration. An additional parallel connecting switch 48 and an additional ground switch 49 are provided for more effectively changing the main motors 1 and 2 from parallel to series relation during regeneration. Accelerating switches or contactors 51 and 52 are employed to shunt the accelerating resistor 15. Accelerating contactors 53 and 54 are employed to shunt the accelerating resistor 16.

"Part field" switches 55 and 56 are employed for weakening the exciting effect of the field-magnet windings 5 and 6 of the motors 1 and 2, respectively. Armature switches 57 and 58 are employed to shunt the armature windings 12 and 13, respectively, of the auxiliary motor 9. The reverser 59, which constitutes a part of the sequence switch or controller 21, (see Fig. 14) is employed for reversing the energization of the field-magnet winding 11 of the auxiliary motor 9.

The field-magnet winding 11 is connected to the "trolley" by a field switch or contactor 60. The reverser 59 comprises a plurality of stationary control fingers 61 to 64, inclusive, which are adapted to be engaged by contact segments 65 and 66 during the period of acceleration, and by contact segments 67 and 68 during the braking period.

The control system has been illustrated in the simplest possible manner for the sake of clearness; therefore, reversing switches for the field-magnet windings 5 and 6 of the motors 1 and 2, respectively, and for the armature windings 12 and 13 of the auxiliary motor 9 have been omitted from the drawing.

Only the main control circuits have been illustrated, as this invention does not relate to the auxiliary control system of a railway motor vehicle.

The main motors 1 and 2 and the auxiliary motor 9 are mechanically connected to axles 71 and wheels 72 for driving purposes. The auxiliary motor 9 is preferably geared but may be otherwise mechanically connected to an idle axle of the locomotive or railway motor vehicle.

The operation of our control system during the acceleration of the motor vehicle is begun by actuating a platform controller (not illustrated) to a position corresponding to step 1 of the sequence chart (Fig. 2), thereby closing line switch 39, series switch 45, "full field" switches 42 and 43 and field switches 60 and 20. The auxiliary controller 21 is also actuated to its first position, thereby shunting all of the field resistors 22. Upon closure of these switches, a plurality of circuits are established as illustrated in Fig. 3 of the drawing.

The circuit (Fig. 1) for the field-magnet winding 11 of the auxiliary motor 9 extends from the trolley through the pantagraph 8, field switches 60 and 20, a portion of the resistor 19, control fingers 23 and 33, which are bridged by contact segment 34 of the controller 21, control fingers 61 and 64, which are bridged by contact segment 65 of the reverser 59, field-magnet windings 11 of the auxiliary motor 9 and control fingers 62 and 63, which are bridged by contact segment 66 of the reverser 59, to ground.

A circuit is also established from the trolley through pantagraph 8, manually operable switch 37, line switch 39, starting resistor 14, armature 3 and series field-magnet winding 5 of the main motor 1, "full field" switch 42, armature winding 12 of the auxiliary motor 9, starting resistor 15, series switch 45, starting resistor 16, armature 4 and series field-magnet winding 6 of the main motor 2, "full field" switch 43 and armature winding 13 of the auxiliary motor 9 to ground.

Figure 2:
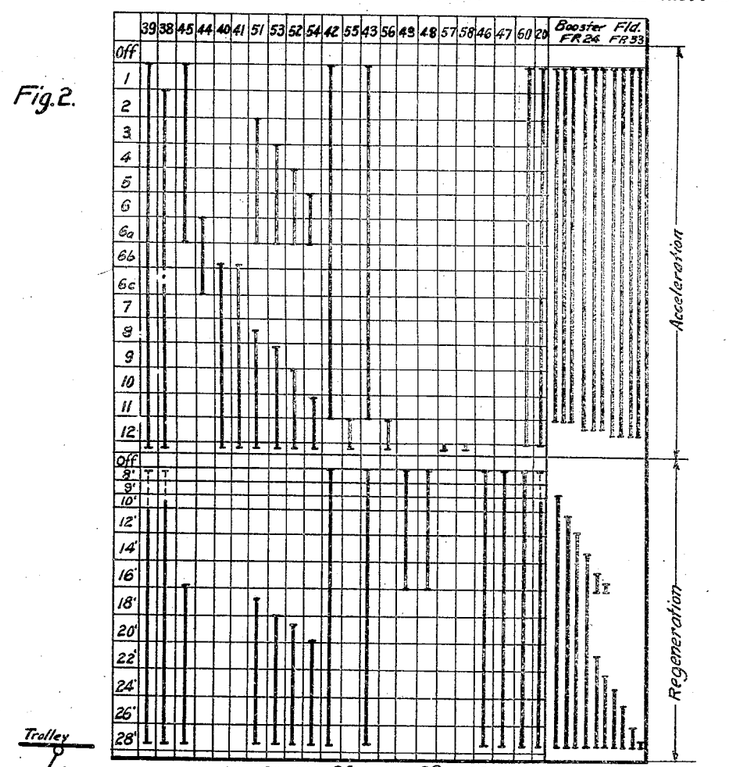
Fig. 2 is a sequence chart showing the order of operation of the main switches or contactors of the control system illustrated in Figure 1, during acceleration and regeneration.
Figure 3:
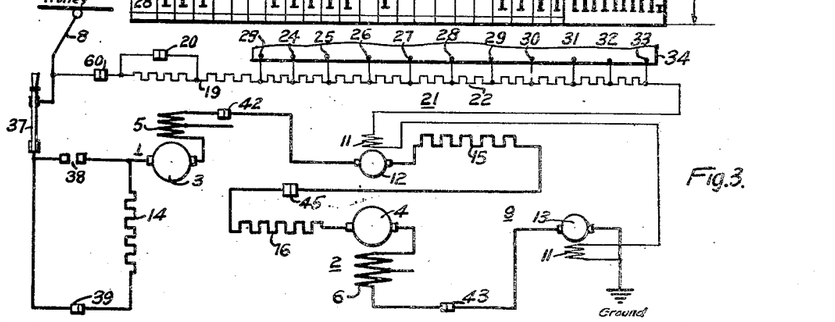
Figs. 3 to 8, inclusive, are diagrammatic views illustrating how the motors and starting resistors shown in Fig. 1 of the drawings are connected one to another at different steps in the sequence of operation of the control system during acceleration.
Figure 4:
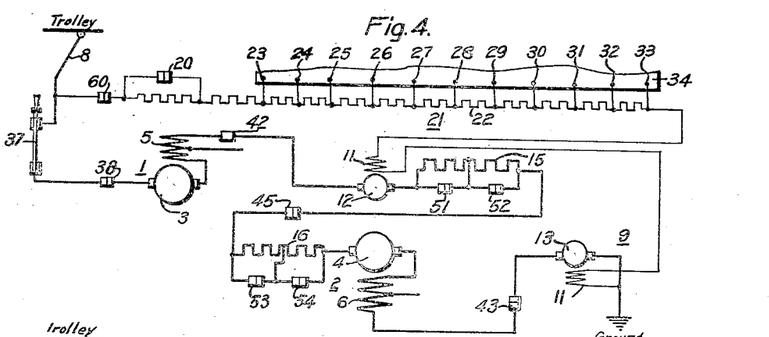

The next step in acceleration of motors 1, 2 and 9 is effected by closing line switch 38, which corresponds to step 2 of the sequence chart of Fig. 2. The closure of the line switch 38 shunts the starting resistor 14. Steps 3 to 6 in the acceleration of the motors 1, 2 and 9 comprise closing the accelerating switches 51 to 54, one at a time—in the order illustrated in the sequence chart of Fig. 2—thereby shunting the starting resistors 15 and 16. Figure 4 of the drawings, which illustrates the main circuits of the control system with the starting resistors 15 and 16 completely shunted, corresponds to step 6 of the sequence chart of Fig. 2.

Figure 5:
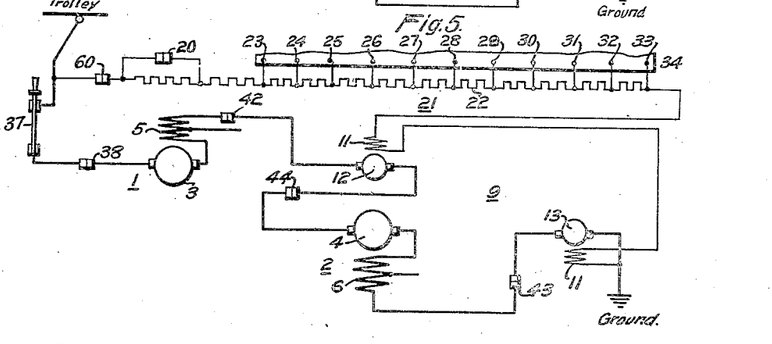

The next step in the acceleration of the motors 1, 2 and 9 is to effect their transition from series to parallel relation. This is accomplished by first closing the series switch 44 and then opening switches 45 and 51 to 54, inclusive, as indicated in Fig. 2. The position of all the main switches of the control system then corresponds to step 6b of the sequence chart of Fig. 2, and Fig. 5 illustrates the main circuit connections of our control system corresponding to that step.

In accordance with step 6b of the sequence chart, Fig. 2, the main circuit connections that are established are as follows, there being no change in the circuit comprising the field-magnet winding 11 of the auxiliary motor 9 from that established at the beginning of the acceleration period. A main circuit is established from the trolley through pantagraph 8 and switch 37, line switch 38, armature 3 and series field-magnet winding 5 of main motor 1, "full field" switch 42, armature winding 12 of the auxiliary motor 9, series switch 44, armature 4 and series field-magnet winding 6 of main motor 9, "full field" switch 43 and armature winding 13 of the auxiliary motor 9 to ground.

Figure 6:
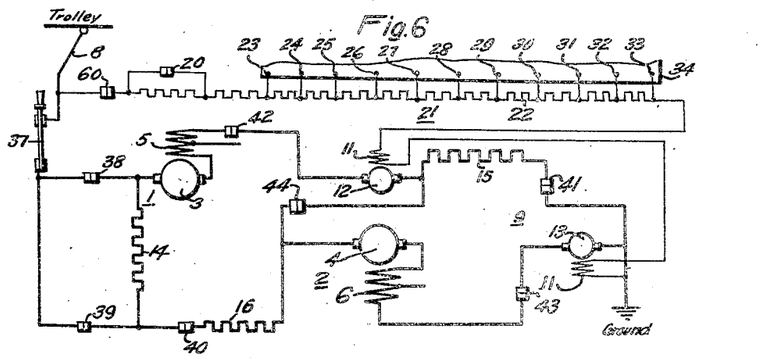

The next step in the acceleration of the motors 1, 2 and 9 is to close the parallel connecting switch 40 and the ground switch 41, thereby establishing two parallel circuits through the main motors 1 and 2, as is illustrated in Fig. 6 of the drawing. This arrangement of switches corresponds to step 6c of the sequence chart. One circuit that is established extends from switch 37, through line switch 38, armature 3 and series field-magnet winding 5 of main motor 1, "full field" switch 42, armature winding 12 of the auxiliary motor 9, starting resistor 15 and ground switch 41 to ground. The other parallel circuit extends from switch 37, through line switch 39, parallel connecting switch 40, starting resistor 16, armature 4 and series field-magnet winding 6 of main motor 2, "full field" switch 43, and armature winding 13 of the auxiliary motor 9 to ground.

Figure 7:
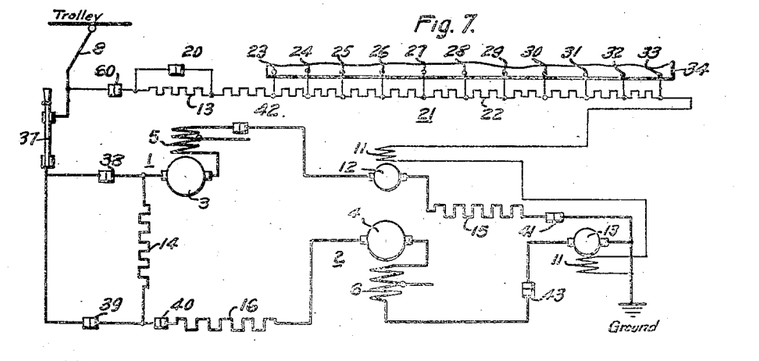

The series switch 44 is then opened in accordance with step 7 of the sequence chart— and the two parallel circuits just described remain intact as illustrated in Figure 7 of the drawings. Steps 8 to 11, inclusive, of the acceleration comprise consecutively closing the accelerating switches 51 to 54, inclusive, in the order shown by the acceleration sequence chart of Figure 2, thereby again shunting the starting resistors 15 and 16.

The energization of the series field-magnet windings 5 and 6 of the motors 1 and 2, respectively, is next lessened by the closure of the "part field" switches 55 and 56, respectively, and the opening of the "full field" switches 42 and 43 to increase the speed of the main motors 1 and 2, as indicated in step 12 of the sequence chart.

The last step in the acceleration of the main motors 1 and 2 comprises gradually weakening the energization of the field-magnet winding 11 of the auxiliary motor 9 by inserting the resistor 22 of the controller 21 in circuit therewith. The insertion of the resistor 22 is accomplished by actuating the auxiliary controller 21 from position 2 to position 6, (see Fig. 14) thereby disengaging the contact segment 34 from control fingers 23 to 33, inclusive. After the energization of the field-magnet winding 11 of the auxiliary motor 9 has thus been decreased, the field switch 60 is opened. The reverser 59 of the controller 21 occupies a neutral position when the controller 21 occupies position 6, as contact segments 65 and 66 do not then engage control fingers 61 to 64, inclusive, of the reverser 59. The armature windings 12 and 13 of the motor 9 are finally shunted by means of the closure of the armature switches 57 and 58, respectively.

Figure 8:
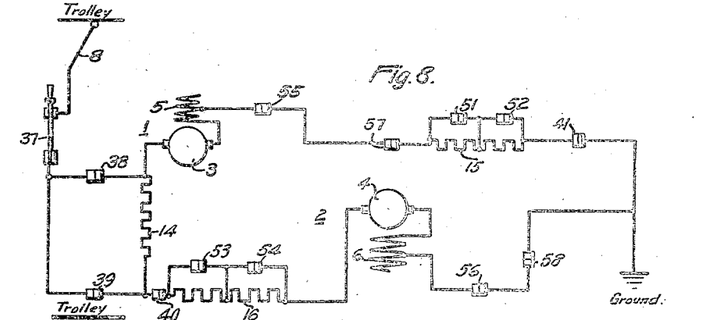

The main control circuits, when full speed is attained, are illustrated by Fig. 8 of the drawing. One of these main control circuits is established from switch 37, through line switch 38, armature 3 and a portion of the series field-magnet winding 5 of the main motor 1, "part field" switch 55, armature switch 57, accelerating switches 51 and 52 and ground switch 41 to ground. The other main circuit is established from switch 37, through line switch 39, parallel connecting switch 40, accelerating switches 53 and 54, armature 4 and a portion of series field-magnet winding 6 of the main motor 2, "part field" switch 56 and armature switch 58 to ground.

From the above description of the acceleration of the vehicle by means of its main motors 1 and 2 and the auxiliary motor 9, it is apparent that the auxiliary motor 9 will aid in starting the vehicle by increasing the tractive effort by applying power to a different pair of wheels of the vehicle. A considerable portion of the power consumed by the auxiliary motor 9 would otherwise be uselessly expended in heating the accelerating resistors.

The operation of the control system of the vehicle during regeneration will be next set forth.

Referring to the lower portion of the sequence chart, entitled "Regeneration", the first position thereof is numbered 8′ corresponding to position 8 of the auxiliary controller 21 (see Fig. 14) and shows all the main switches open except switches 42, 43, 46, 47, 48, 49 and 60.

Figure 9:
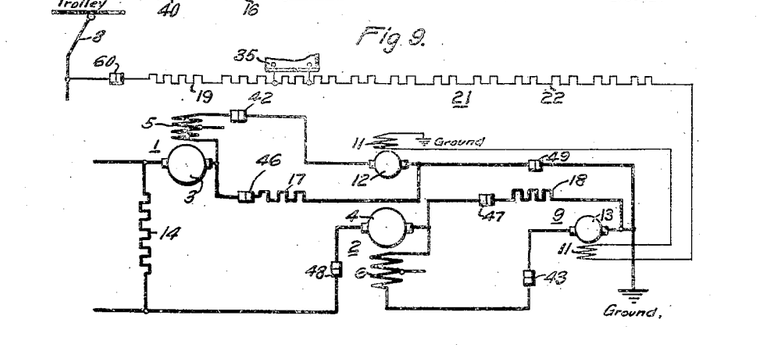
Figs. 9 to 13, inclusive, are diagrammatic views of the control system illustrated in Fig. 1 of the drawings showing the manner of connecting the motors at various steps during the period of regeneration. (A sequence switch for reversing the energization of the field-magnet winding of the auxiliary motor has been omitted from Figs. 3 to 13, inclusive, to simplify the diagrams;)

The arrangement of the main circuits of the control system corresponding to step 8′ of the regeneration sequence chart of Fig. 2 and to the diagram illustrated in Fig. 9 of the drawing. The circuit that is established by the closure of the field switch 60 and auxiliary controller or sequence switch 21, extends from pantagraph 8, through field switch 60, field resistor 19, field resistor 22 of the auxiliary controller 21, control fingers 61 and 62, which are bridged by contact segment 67 of the reverser 59, field-magnet winding 11 of the auxiliary motor 9, and control fingers 63 and 64, which are bridged by contact segment 68 of reverser 59 to ground.

Further operation of the reverser 59 of the sequence switch 21 changes the direction of the current traversing field-magnet winding 11 of the auxiliary motor 9, thereby reversing the current traversing the armature windings 12 and 13 of the motor 9. This reversal of the connections of the field-magnet winding 11 takes place when the auxiliary controller 21 approaches its position 8 (see Fig. 14).

The series field-magnet winding 5 of the main motor 1 is energized by current traversing a circuit from armature winding 12 of the auxiliary motor 9, through stabilizing resistor 17, regenerative switch 46, series field-magnet winding 5 of the main motor 1 and "full field" switch 42 to the armature winding 12 of the auxiliary motor 9. The series field-magnet winding 6 of the main motor 2 is energized by a circuit that is established from the armature winding 13 of the auxiliary motor 9, through the stabilizing resistor 18, regenerative switch 47, series field-magnet winding 6 of the main motor 2 and "full field" switch 43 to the armature winding 13 of the auxiliary motor 9.

The motors 1 and 2 remain disconnected from the source of electrical energy marked Trolley until the voltage generated by the motor 1 is substantially the same as that between the trolley and ground.

The sequence switch or auxiliary controller 21 is slowly actuated toward position 10 to shunt a portion of the resistor 22, thereby increasing the energization of the field-magnet winding 11 of the auxiliary dynamo-electric machine 9. The increased energization of the field-magnet winding 11 causes the armature windings 12 and 13 thereof to increase the energization of the series field-magnet windings 5 and 6 of the main motors 1 and 2, respectively.

Upon the voltage of the motor 1 becoming equal to, or slightly in excess of, the line voltage, the switch 38 may be automatically or otherwise closed, thereby establishing two main circuits. One of the main circuits that is established extends from ground through the additional ground switch 49, stabilizing resistor 17, regenerative switch 46, armature 3 of the main motor 1, line switch 38, manually operable switch 37 and pantagraph 8 to the trolley.

The other circuit that is established is from ground through stabilizing resistor 18, regenerative switch 47, armature 4 of the main motor 2, additional parallel connecting switch 48, resistor 14, line switch 38, manually operable switch 37 and pantagraph 8 to the trolley.

Figure 10:
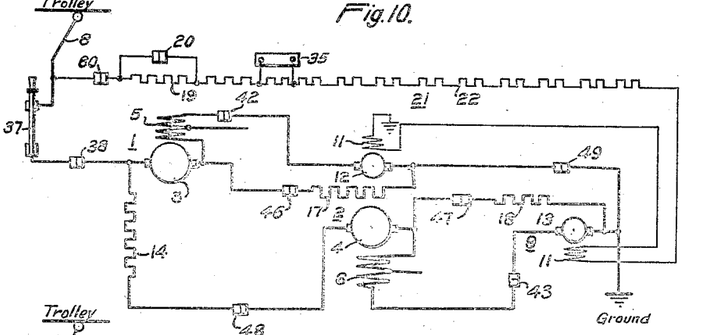

The diagram of Figure 10 of the drawings illustrates the main circuits corresponding to intermediate step 9′ of the regeneration sequence chart of Figure 2.

After the closure of line switch 38, switch 20 is closed, thereby increasing the energization of the field-magnet winding 11 of the auxiliary motor 9. The increased energization of the field-magnet winding 11 correspondingly increases the voltage across the terminals of the armature windings 12 and 13 of the same motor. This increased voltage is necessary to balance the increased voltage drop across the stabilizing resistors 17 and 18, when the line switch 38 is closed, this increased drop in voltage being caused by the increased current traversing the stabilizing resistors 17 and 18. See step 10′ of the regeneration sequence chart of Figure 2.

The next step in regenerative braking of the main motors 1 and 2 comprises closing the line switch 39, as indicated in step 10′ of the sequence chart, thereby establishing a circuit from ground, through the stabilizing resistor 18, regenerative switch 47, armature 4 of the main motor 2, additional parallel connecting switch 48, line switch 39, manually operable switch 37 and pantagraph 8 to trolley. The motors 1 and 2 are now connected in parallel relation between the ground and trolley and are acting as generators for the electrical braking of the vehicle. Fig.

Figure 11:
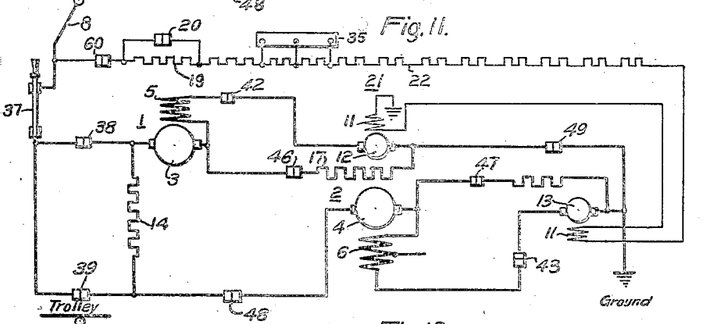

11 of the drawings illustrates the main circuits of the control system corresponding to step 10′ of the regeneration sequence chart of Fig. 2.

The next step in the regenerative braking of the motors 1 and 2 is to gradually increase the energization of the field-magnet winding 11 of the auxiliary dynamo-electric machine or motor 9, thereby increasing the energization of the series field-magnet windings 5 and 6 of the main motors 1 and 2, respectively. The energization of the field-magnet winding 11 of the auxiliary dynamo-electric machine 9 is increased by means of the auxiliary controller 21 gradually shunting the portion of the resistor 22 between contact terminals 24 and 30. This gradual shunting of the resistor 22 is indicated by steps 10′ to 16′, inclusive, of the regeneration sequence chart of Fig. 2. The increased energization of the series field-magnet windings 5 and 6 of the main motors 1 and 2 tends to maintain or increase the current generated by the corresponding armatures 3 and 4 of these motors.

The next step in the regenerative operation of the motors 1 and 2 is to change them from parallel to series relation, the one to the other. This change in the connections of the motors 1 and 2 is effected by closing the series switch 45 and then opening the switches 48 and 49. These changes correspond to the step marked 16′ of the regeneration sequence chart of Fig. 2 of the drawing.

Figure 12:
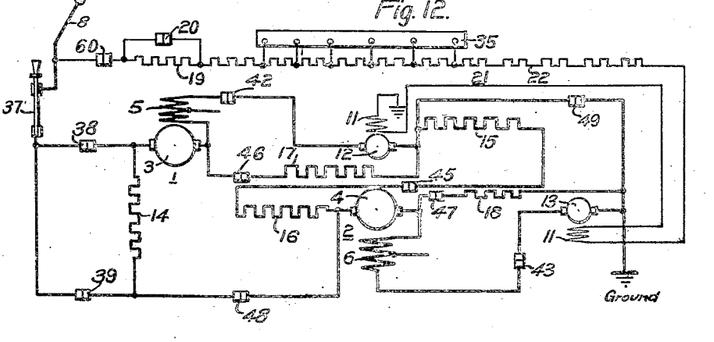

Upon the closure of switch 45, a circuit is established, in accordance with Fig. 12 of the drawings, from the ground through stabilizing resistor 18, regenerative switch 47, armature 4 of the main motor 2, accelerating resistor 16, series switch 45, accelerating resistor 15, stabilizing resistor 17, regenerative switch 46, armature 3 of the main motor 1, line switch 38, manually operable switch 37, and pantagraph 8 to the trolley. A circuit is also momentarily established from the trolley through the pantagraph 8, manually operable switch 37, line switch 39, additional parallel switch 48, accelerating resistors 16 and 15, and additional ground switch 49 to ground.

This last circuit between trolley and ground is safe, and free from harmful effects, as it comprises both of the accelerating resistors 15 and 16, which are connected in series relation. Upon the subsequent opening of the switches 48 and 49, the motors 1 and 2, which are functioning as generators, become connected in series relation, the one to the other, and the starting resistors 15 and 16, as well as the stabilizing resistors 17 and 18, are connected in series relation therewith.

The main motors 1 and 2 thus remain connected in parallel relation, the one to the other, until the switches 48 and 49 are opened, and electrical braking continues without interruption through the short period during which switches 45, 48 and 49 are closed simultaneously. The reason for this continuous electrical braking by both main motors 1 and 2 is that the armature circuit of each of these motors is never opened and there is no danger of an electrical short circuit as both of the accelerating resistors 15 and 16 are connected in series relation in both of the circuits comprising the respective armatures 3 and 4 of the main motors 1 and 2, respectively.

Figure 13:
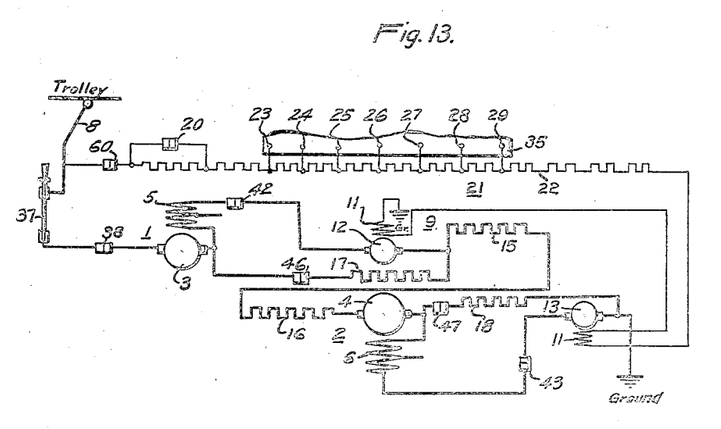

Fig. 13 is employed to illustrate the main control circuits just after the motors 1 and 2 have been changed over to series relation and corresponds to an intermediate position between positions 16′ and 18′ of the regenerative sequence chart of Fig. 2.

The next steps, (see position 18 of the regeneration sequence chart of Fig. 2) in the regenerative operation of the main motors 1 and 2 comprise closing the accelerating switches or contactors 51 and 53, thereby shunting portions of the accelerating resistors 15 and 16, respectively. The controller 21 is then actuated to position 18 to reinsert the portion of the resistor 22 that is between control fingers 27 and 30 in circuit with the field-magnet winding 11 of the auxiliary motor 9, thereby weakening the energization of the winding 11.

The accelerating switches 52 and 54 are next closed, (see position 20 of the sequence chart of Fig. 2) thereby shunting the remaining portion of the resistors 15 and 16, respectively. The main motors 1 and 2 are now connected in series relation, the one with the other and with the stabilizing resistors 17 and 18, and are connected to the source of electrical energy marked "Trolley" and return circuit marked "Ground" without any portion of accelerating resistors 15 and 16, inclusive, being connected therewith.

The remaining steps in the regenerative operation of the control system are effected by actuating the controller 21 in the direction to gradually shunt the remaining portion of the resistor 22, (which is that portion between control fingers 27 and 33), thereby increasing the energization of the field-magnet winding 11 of the auxiliary machine 9 to its maximum strength. These control changes are represented by steps 22′ to 28′ of the sequence chart of Fig. 2 of the drawings and correspond to the like numbered positions of the controller 21. The increased energization of the winding 11 of the dynamo-electric machine 9 increases the voltage generated by the auxiliary machine, thereby increasing the energization of the series field-magnet windings 5 and 6 of the main motors 1 and 2, respectively. The increased energization of these field-magnet windings tends to maintain the electrical braking effort constant as the speed of the vehicle diminishes. The main circuits of the control system corresponding to position 28' of the regenerative sequence chart of Fig. 2 are illustrated in Fig. 13 of the drawing.

From the above description it is apparent that we have provided a control system for effecting the regenerative operation of a plurality of motors that eliminates reversing the connections of the field-magnet windings of the main motors to their corresponding armatures. Our control system also permits connecting the main motors 1 and 2 in series relation, the one with the other, without disconnecting either motor from the line, even momentarily. At all times, the motors 1 and 2 are effecting electrical braking, thereby increasing the uniform deceleration of the motor vehicle 7.

By providing a sequence switch or controller in circuit with the field-magnet winding of the dynamo-electric machine 9, which is employed as an exciter of the field-magnet windings of the main motors, it is also possible to gradually change the energization of the field-magnet windings of the main dynamo-electric machines to thus secure uniform regenerative braking of the vehicle.

It is also of considerable advantage to have the reversing switches for the field-magnet winding of the auxiliary motor mounted upon, and governed by, the sequence switch that governs the energization of the winding, as this construction reduces the number of operations required of the operator to effect electrical braking.

It is also of considerable advantage to employ a resistor and a switch for shunting a portion of it, in series relation with the field-magnet winding of the dynamo-electric machine that is employed as an exciter, for the reason that the increased current that traverses the stabilizing resistor, when a main motor is connected to the trolley, will decrease the energization of the field-magnet windings of the main motor unless the voltage of the current generated by the exciter is correspondingly increased. This increased voltage of the exciter is secured by the switch 20 shunting a portion of resistor 19 in circuit with the field-magnet winding of the exciter.

It will be understood that, if desired, two independent auxiliary motors or exciters may be employed in lieu of the double-armature-winding machine 9 that we have illustrated and preferably utilize.

While we have illustrated our invention in its preferred form, it is apparent that minor modifications may be made in the arrangement of circuits and apparatus employed without departing from the spirit of our invention; and we desire, therefore, to be limited only by the scope of the appended claims.

What we claim as our invention is:

1. In a motor-control system, the combination with a dynamo-electric machine having an exciting winding, of a second dynamo-electric machine for energizing said winding, a stabilizing resistor, a source of electrical energy, means for connecting said first machine to said source of energy, means for connecting said resistor to both machines, and means comprising a relatively rapid voltage-varying device and a slow voltage-varying device for governing the energization of said second dynamo-electric machine, said rapid voltage-varying device operating immediately upon said first machine being connected to said source to compensate for the increased voltage drop across said stabilizing resistor and the other of said voltage-varying devices being employed to gradually change the energization of said second machine.

2. In a motor-control system, the combination with a plurality of dynamo-electric machines, each of said machines having a field-magnet winding, of a source of electrical energy, a stabilizing resistor, means comprising a switch for connecting one of said machines to said source, a sequence switch and a resistor connected in series relation with the field-magnet winding of the other of said machines, and another switch for shunting said resistor to compensate for the increased current in said stabilizing resistor upon the first-named switch closing.

3. In a motor-control system, the combination with a plurality of dynamo-electric machines, each of said machines having a field-magnet winding, of a source of electrical energy, a stabilizing resistor, means comprising a switch for connecting one of said machines to said source, a field sequence switch and a field-resistor connected in series relation with the field-magnet winding of the other of said machines, said sequence switch being of relatively slow operation, and a second switch for shunting said field resistor to compensate for the increased current in said stabilizing resistor upon the first-named switch closing.

4. In a motor-control system, the combination with a dynamo-electric machine, of a second dynamo-electric machine, each of said machines having an armature and a field-magnet winding, a source of electrical energy, means comprising a switch and a stabilizing resistor for connecting said first-named machine to said source of electrical energy, means for connecting the armature winding of said second machine in series relation with the field-magnet winding of said first-named machine and said stabilizing resistor, and means comprising two voltage-varying devices for connecting the field-magnet winding of said second machine to said source of electrical energy, one of said voltage-varying devices operating to rapidly increase the energization of the field-magnet winding of said second machine upon the closure of said switch.

5. In a motor-control system, the combination with a dynamo-electric machine, of a second dynamo-electric machine, each of said machines having an armature and a field-magnet winding, a source of electrical energy, means comprising a switch and a stabilizing resistor for connecting said first-named machine to said source of electrical energy, means for connecting the armature winding of said second machine in series relation with the field-magnet winding of said first-named machine and said stabilizing resistor, and means comprising two voltage-varying devices for connecting the field-magnet winding of said second machine to said source of electrical energy, one of said devices operating to rapidly increase the energization of the field-magnet winding of said second machine upon the closure of said switch and the other of said devices operating to secure a more gradual change of energization of the same winding thereafter.

6. In a motor control system, in combination, a main traction motor, an auxiliary traction motor, means for connecting the field winding and armature of the main motor in series circuit relation with the armature of the auxiliary motor, a source of power supply, means for connecting the main and auxiliary motors when so connected to the power supply for operation as motors, means for accelerating said motors step-by-step, and means for shunting the armature and deenergizing the field winding of the auxiliary motor after a predetermined step in the acceleration of the motors has been effected, whereby the auxiliary motor is deenergized and the main motor maintained energized for operation as a motor.

7. In a motor control system, in combination, a main traction motor, an auxiliary traction motor, means for connecting the field winding and armature of the main motor in series circuit relation with the armature of the auxiliary motor, a source of power supply, means for connecting the main and auxiliary motors when so connected to the power supply for operation as motors, means for accelerating said motors step-by-step, means for shunting the armature and deenergizing the field winding of the auxiliary motor after a predetermined step in the acceleration of the motors has been effected, whereby the auxiliary motor is deenergized and the main motor maintained energized for operation as a motor, a balancing resistor, means for connecting said resistor in shunt with the main motor field winding and then connecting the armature of the auxiliary motor across said resistor and the main motor field winding and reenergizing the auxiliary motor field winding, whereby the auxiliary motor operates as a generator to energize the field winding of the main motor to effect operation of the main motor as a generator.

8. In a motor control system, in combination a plurality of main traction motors each having an armature and field winding, an auxiliary traction motor having two armature windings and a field winding, means for connecting the armature and field winding of the respective traction motors in series circuit relation with the respective armatures of the auxiliary motor, means for connecting the motors so connected and the field winding of the auxiliary motor to a source of power supply for operation as motors, means for accelerating said motors step-by-step, and means for disconnecting the auxiliary motor from the source of supply to render it inoperative as a motor after a predetermined step in the acceleration of said main traction motors has been effected.

In testimony whereof, we have hereunto subscribed our names this 16th day of December, 1924.

NORMAN W. STORER.
ANDREW H. CANDEE.
LOUIS M. ASPINWALL.